United States Patent
Crockett et al.

(10) Patent No.: US 10,528,530 B2
(45) Date of Patent: Jan. 7, 2020

(54) FILE REPAIR OF FILE STORED ACROSS MULTIPLE DATA STORES

(71) Applicant: Microsoft Technology Licensing, LLC, Redmond, WA (US)

(72) Inventors: Sterling J. Crockett, Belmont, MA (US); Jeffrey Stix, Cambridge, MA (US); Anup S. Parameswaren, Cambridge, MA (US); Dana M. Zircher, Cambridge, MA (US); Steve Buzzell, Arundel, ME (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 791 days.

(21) Appl. No.: 14/838,590

(22) Filed: Aug. 28, 2015

(65) Prior Publication Data

US 2016/0299937 A1    Oct. 13, 2016

Related U.S. Application Data

(60) Provisional application No. 62/144,573, filed on Apr. 8, 2015.

(51) Int. Cl.
| | | |
|---|---|---|
| G06F 17/30 | (2006.01) | |
| G06F 12/00 | (2006.01) | |
| G06F 15/16 | (2006.01) | |
| G06F 16/18 | (2019.01) | |

(52) U.S. Cl.
CPC ................. *G06F 16/1873* (2019.01)

(58) Field of Classification Search
None
See application file for complete search history.

(56) References Cited

U.S. PATENT DOCUMENTS

| | | |
|---|---|---|
| 7,003,587 B1 | 2/2006 | Battat et al. |
| 7,143,120 B2 | 11/2006 | Oks et al. |
| 7,203,796 B1 | 4/2007 | Muppalaneni et al. |
| 7,237,018 B1 | 6/2007 | Kamvysselis |
| (Continued) | | |

OTHER PUBLICATIONS

"Overview of Data Recovery Advisor", Published on : Feb. 5, 2012, Available at: http://docs.oracle.com/cd/E11882_01/backup.112/e10642/rcmrepai.htm#BRADV89714, 27 pgs.
(Continued)

*Primary Examiner* — Thu N Nguyen

(57) ABSTRACT

Non-limiting examples of the present disclosure describe file repair of a file stored across multiple data stores. An inconsistency associated with a file stored across two or more data stores on a client device is identified. A repair action is determined from a plurality of different repair actions based on attributes associated with the inconsistency identified. A repair queue entry is created in a persisted repair queue, the repair queue entry used for execution of the repair action. The repair action is executed as scheduled within the persisted repair queue when pre-requisite checks are satisfied and a persisted repair history for execution of repair actions indicates that no conflicting repair action exists. The persisted repair history and the persisted repair queue are updated based on the execution of the repair action. Other examples are also described.

20 Claims, 10 Drawing Sheets

(56) References Cited

U.S. PATENT DOCUMENTS

| | | | |
|---|---|---|---|
| 7,437,764 B1* | 10/2008 | Sobel | G06F 21/562 713/176 |
| 7,631,214 B2 | 12/2009 | Bockhold et al. | |
| 7,640,457 B2 | 12/2009 | Erwin et al. | |
| 7,702,869 B1 | 4/2010 | Yadav | |
| 7,827,440 B1 | 11/2010 | Dudte et al. | |
| 7,904,756 B2 | 3/2011 | Dilman et al. | |
| 8,301,791 B2 | 10/2012 | Malaiyandi et al. | |
| 8,364,648 B1* | 1/2013 | Sim-Tang | G06F 17/30368 707/674 |
| 8,463,757 B2 | 6/2013 | Wideman et al. | |
| 8,539,285 B2 | 9/2013 | Daily et al. | |
| 8,805,793 B2 | 8/2014 | Patiejunas et al. | |
| 2003/0149709 A1* | 8/2003 | Banks | G06F 16/273 |
| 2005/0108704 A1* | 5/2005 | Marinelli | G06F 8/61 717/174 |
| 2006/0174167 A1 | 8/2006 | Ito | |
| 2007/0276970 A1 | 11/2007 | Werner et al. | |
| 2008/0140962 A1* | 6/2008 | Pattabiraman | G06F 11/167 711/162 |
| 2008/0177702 A1* | 7/2008 | Morgan | G06F 19/3443 |
| 2009/0006792 A1 | 1/2009 | Federwisch et al. | |
| 2010/0083029 A1* | 4/2010 | Erickson | G06F 11/0709 714/2 |
| 2012/0158652 A1 | 6/2012 | Ps et al. | |
| 2013/0282668 A1* | 10/2013 | Hsieh | G06F 16/215 707/691 |
| 2014/0164324 A1 | 6/2014 | Hursh et al. | |
| 2014/0358866 A1* | 12/2014 | Gholmieh | G06F 17/30371 707/691 |
| 2015/0012488 A1 | 1/2015 | van Rossum | |
| 2016/0110406 A1* | 4/2016 | Zircher | G06F 17/30371 707/690 |

OTHER PUBLICATIONS

"Oracle Database High Availability Features and Products", Published on : Dec. 20, 2011, Available at: https://docs.oracle.com/cd/B28359_01/server.111/b28281/hafeatures.htm#g10111, 38 pgs.

"Recovery Manager (RMAN) updated for RAC", Published on: Jun. 16, 2013, Available at: http://www.pafumi.net/rman.htm, 66 pgs.

Chien, et al., "Preventing, Detecting, and Repairing Block Corruption: Oracle Database 11g", In White Page of Oracle Maximum Availability Architecture, May, 2012, 17 pages.

"Message Store Maintenance Queue", Published on : Jun. 3, 2013, Available at: https://wikis.oracle.com/display/CommSuite/Message+Store+Maintenance+Queue#MessageStoreMaintenanceQueue-MailboxSelfHealing%28AutoRepair%29, 3 pgs.

Reichardt, Josh, "Exchange Transport Service won't start", Published on: Feb. 17, 2014, Available at: http://thepracticalsysadmin.com/exchange-transport-service-wont-start/, 3 pgs.

Li, et al., "Managing Data Retention Policies at Scale", In Proceedings of IEEE Transactions on Network and Service Management, vol. 9, No. 4, Dec., 2012, 14 Pages.

"IBM-Enterprise Backup and Restore", Published on: Nov. 2008, Available at: ftp://public.dhe.ibm.com/software/data/cm/filenet/docs/isdoc/412x/EBR.pdf, 458 pgs.

Gharaibeh, et al., "Exploring Data Reliability Tradeoffs in Replicated Storage Systems", In Proceedings of the 18th ACM International Symposium on High Performance Distributed Computing, Jun. 6, 2011, 10 pages.

U.S. Appl. No. 14/621,802, Norbauer, et al., "Validation of Data Across Multiple Data Stores", filed Feb. 13, 2015.

Couch DB the Definitive Guide, Published on: Aug. 29, 2010, Available at: http://guide.couchdb.org/draft/consistency.html#consistency, 4 pgs.

Mizonov, et al., "Azure Table Storage and Windows Azure SQL Database—Compared and Contrasted", Retrieved on: Sep. 15, 2014 Available at: http://msdn.microsoft.com/en-us/library/azure/j553018.aspx, 4 pgs.

U.S. Appl. No. 14/621,802, Amendment and Response filed Aug. 17, 2017, 16 pages.

U.S. Appl. No. 14/621,802, Office Action dated Oct. 12, 2017, 15 pages.

U.S. Appl. No. 14/621,802, Office Action dated May 17, 2017, 12 pages.

"Non Final Office Action Issued in U.S. Appl. No. 14/621,802", dated May 10, 2018, 17 Pages.

"Final Office Action Issued in U.S. Appl. No. 14/621,802", dated Oct. 9, 2018, 17 Pages.

* cited by examiner

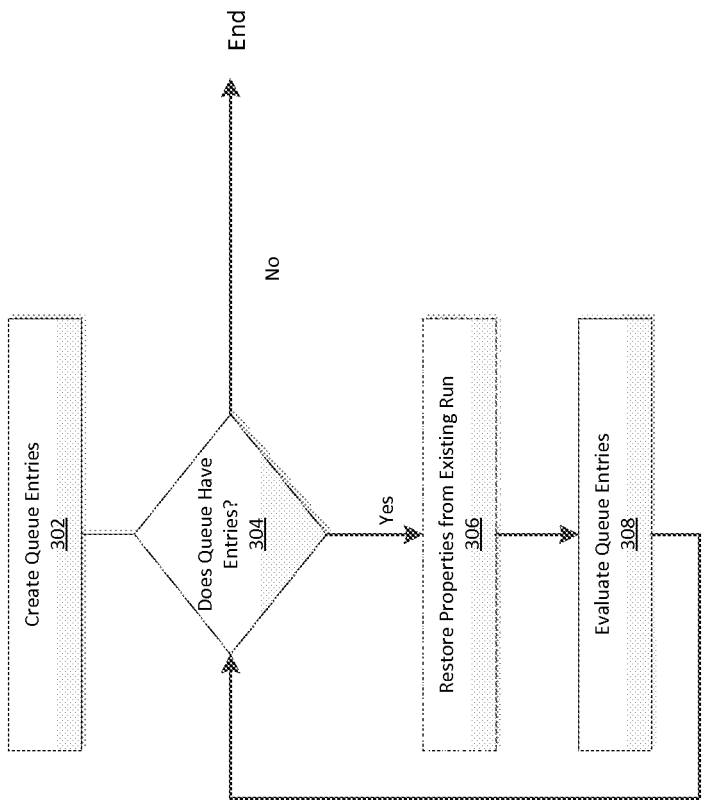

320

400

FILE REPAIR OF FILE STORED ACROSS MULTIPLE DATA STORES

CROSS-REFERENCE TO RELATED APPLICATIONS

This application claims the benefit of U.S. Provisional Application No. 62/144,573, filed Apr. 8, 2015, the entire disclosure of which is hereby incorporated herein by reference.

BACKGROUND

In general, with multiple integrated data stores, data can get out of sync and/or corrupted in some locations. Although any one given data store may be able to maintain its own state, it is critical that the various stores stay in sync with each other. When one store becomes corrupt, valid data from other stores can be used to address the corruption. In a client-server scenario, it would be simple to completely restore the data on the client from the server, but this is expensive in both processing and network resource utilization.

SUMMARY

Non-limiting examples of the present disclosure describe file repair of a file stored across multiple data stores. An inconsistency associated with a file stored across two or more data stores on a client device is identified. A repair action is determined from a plurality of different repair actions based on attributes associated with the inconsistency identified. A repair queue entry is created in a persisted repair queue, the repair queue entry used for execution of the repair action. The repair action is executed as scheduled within the persisted repair queue when pre-requisite checks are satisfied and a persisted repair history for execution of repair actions indicates that no conflicting repair action exists. The persisted repair history and the persisted repair queue are updated based on the execution of the repair action. Other examples are also described.

In additional non-limiting examples, the present disclosure describes identifying an inconsistency associated with a file stored across two or more data stores on a client device. An archived version of the file is created on the client device when an inconsistency is identified. A repair action associated with the file is executed, wherein execution of the repair action comprises selecting further action based on comparing a content stream of the archived version of the file with a content stream of a version of the file maintained by a server device. A determination is made as to whether the file is successfully repaired based on the execution of the repair action. Other examples are also described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3A illustrates an exemplary method for queue management of repair entries as described herein.

DETAILED DESCRIPTION

The present disclosure describes file repair of one or more files stored across multiple data stores where corrupt files can be identified individually and corrected in a targeted fashion. There are many different ways in which a file or library (e.g., a collection of files) can be corrupted. Different types of corruption require different types of repair. The present disclosure describes examples that provide a plurality of different types of repair actions/options that may run autonomously as background processing (e.g., behind the scenes without user intervention), for example. Examples described herein provide technical solutions that are quicker, much less resource intensive and much less prone to large-scale mistakes as compared with completely restoring the data on a client/local device, for example.

Accordingly, the present disclosure provides a plurality of technical effects including but not limited to: increased processing speed and processing efficiency in identifying fix/repair options and repairing inconsistencies, reduced network bandwidth utilization, increased accuracy in repair option matching and reduced error rate for file repair operations, reduced memory space required for repairing files as compared with complete restore of files on a client/local device, automation in repair scheduling and operation execution requiring minimal user interaction, improved usability for both developers and users, reduction in synchronization errors among data stores, and improved client/server interaction, among other examples.

Figure 1:
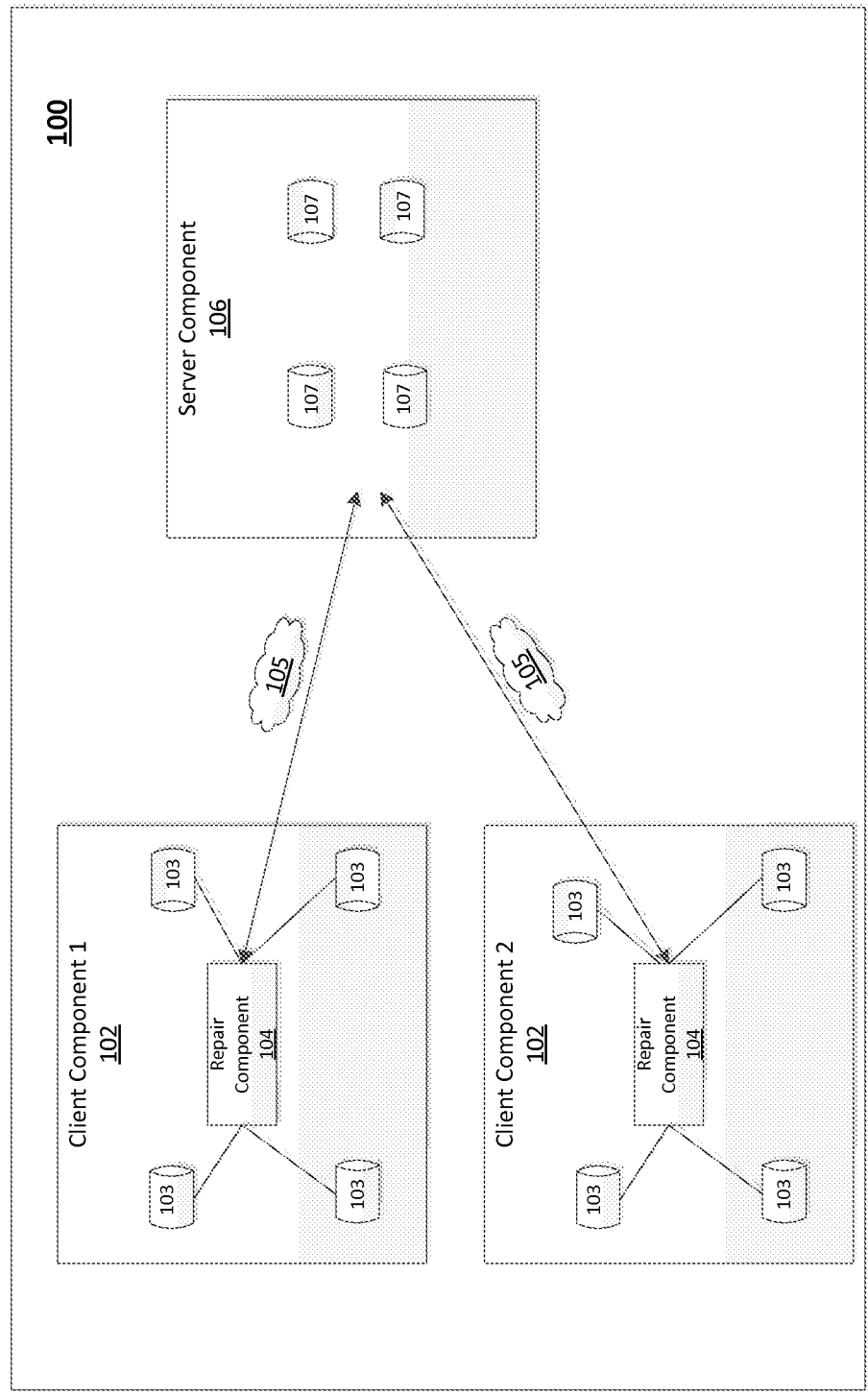
FIG. 1 illustrates an overview of an example system that may be used for repair of files as described herein.

FIG. 1 illustrates an overview of an example system 100 that may be used for repair of files as described herein. Exemplary system 100 is a combination of interdependent components that interact to form an integrated whole for performing processing operations such as detection operations for detecting inconsistency and repair operations for repairing an inconsistency. Components of the systems may be hardware components or software implemented on and/or executed by hardware components of the systems. In examples, system 100 may include any of hardware components (e.g., used to execute/run operating system (OS), ASIC), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. For of a processing device operating environment, refer to operating environments of FIGS. 5-7. In other examples, the components of systems disclosed herein may be spread across multiple devices. For instance, input may be entered on a client device (e.g., processing device) and information may be processed or accessed from other devices in a network such as one or more server devices.

As an example, the system 100 may be used to run software components such as applications or services enabling clients or users to access and manage data through file hosting applications/services. The system 100 may implement protocols or frameworks to oversee applications, services, processes, etc., running on client component 102 of the system 100. In one example, the system 100 may run a file hosting application or service, allowing clients or users to upload and sync files to data stores/storages via a distributed network (e.g., cloud storage). The file hosting application/service may allow clients to access files using an application (e.g. web browser) running on the client component 102 such as a processing device (e.g., mobile device, computer, laptop tablet or any device having one or more processors). File hosting applications/services may be associated with online services and allow users to keep files private, share them with contacts, or make files public. Examples of such filing hosting applications/services may be iterations of any distributed storage solution including Google Drive, ICLOUD, IBM SMARTCLOUD, DROPBOX, SUGARSYNC, SYNCPLICITY, OwnDrive, ONEDRIVE, SKYDRIVE, and Windows Live Folders, among other examples. Other types of applications or services related to data synchronization may also be applicable.

As one example, the system 100 comprises one or more client components 102 (hereinafter "client component 102") and a server component 106, each having one or more additional components. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network. The client component 102 is a processing device and/or application/service running on a processing device that may be used for any processing operations including, but not limited to, file management. The client component 102 is connectable to the server component 106 via a network connection. Data may be transmitted between a client component 102 and a server component 106 over the network as shown in communication line 105 of FIG. 1. The server component 106 is a processing device and/or application/service running on a processing device that may be used for management access to a centralized resource or service in the network of system 100.

A client component 102 may comprise a plurality of data stores 103 (e.g., data storages/memory/virtual memory spaces) and a repair component 104. Data may be stored locally on the client component 102 using data stores 103. A data store 103 may be a subsystem of file data including files and folders of information. Examples of data stored by an individual data store 103 of the client component 102 may include but are not limited to the following types of data: validation data, metadata, data on files, libraries and file systems, folder description information, and operating system data, among other examples. A file is a collection of data, instructions, object, etc. A file can store any type of data in any format.

Data stores 103 are integrated data stores that maintain different types of data. For example, each of the data stores 103 of system 100 may store different types of data related to a file maintained locally on the client component 102. In one example, a data store 103 of client component 102 may manage synchronization data for files maintained on the server component 106 and another data store may store data for files persisted to disk. In one example, each of the data stores 103 may be persisted to disk on a client component 102. However, one skilled in the art will recognize that data stores 103 may also be virtual memory maintained on a client component 102.

The repair component 104 is a processing device component or application/service that is usable to identify and fix inconsistencies among data stores 103 of a client component 102. In some instances, pairwise relationships may exist between data stores of the client component 102. A pairwise relationship is a correlation between data stores for comparing data maintained by the data stores. However, validation issues may arise when it comes to validating data for a validatable component across multiple integrated data stores. Integrated data stores relate to the storage of data or portions of data across more than one data store. For example, integrated data stores may store portions of an individual file across multiple data stores, that when combined, provide complete information for the individual files or files. An inconsistency is any instance where a file is corrupted or data maintained by one data store does not match data of another data store. In some examples, data related to a single file is stored across multiple integrated data stores. An example inconsistency may be a case where a location of the file in one data store, which stores a portion of data of the file, points to the file being stored in a first location while another data store, which stores another portion of data for the file, points to the location of the file being stored in a different location. In that example, it is likely that a user has modified the file (e.g., content, properties/attributes, location, etc.) and the data stores 103 of a client component 102 have lost synchronization or fallen out of sync. Loss of synchronization relates to a concept where changes are not propagated across components of a processing device or changes were not propagated from one processing device to another (e.g., client/server relationship. In another example, an inconsistency may relate to a local error on a processing device due to corruption of a file stored locally on the processing device. In other examples, data stores on client component 102 may be checked for consistency with data stored on the server component 106. In any case, the present disclosure enables identifying and fixing of such inconsistencies before it becomes apparent to a user (or with minimal user interaction/intervention). That is, the examples of the present disclosure may operate without being readily identifiable to a user in order to correct issues before the user identifies such issues related to file errors and/or synchronization errors between data stores 103.

To address identified inconsistencies, the client component 102 may maintain knowledge data that is used in performing validation and repair. Knowledge data, maintained by the client component 102, is any data used by a repair component 104 to detect and repair inconsistencies. In one example, knowledge data may be utilized by the repair component 104 to enable identification of inconsistencies on a client component 102 and update/repair files stored in data stores 103 of a client component 102. In examples, knowledge data may be used to identify relationships between data, such as files stores across data stores of a processing device, as well as enable validation to be performed across the different data stores 103. In other examples, knowledge data is data that ensures a repair component 104 is able to evaluate, detect and repair inconsistencies. Knowledge data may also be data for ensuring that a repair component 104 is up to date as well as performing scheduled operations for inconsistency identification and repair. In one example, the repair component 104 manages knowledge data related to identifying inconsistencies among data stores 103 including corrupted files and operational ability to repair and correct such inconsistencies. Examples of knowledge data that is maintained by a component of system 100 include but are not limited to: synchronization information and binary file information maintained by data stores 103 of the client component 102, data identifying components of system 100, definitions data for components of the system 100, policy rules for executing validations and repair actions, data that may be used for the attribute identification of inconsistencies, identification and application of repair actions, repair evaluation and execution, communication information for interfacing with the server component 106, and any other information or data relevant to enable the client component 102 to identify and repair issues among files maintained by the data stores 103. Updates to knowledge data may be received from one or more components of system 100 such as server component 106.

The server component 106 comprises one or more data stores 107 of data managed across a network of system 100. Similar to a data store 103 of the client component 102, a data store 107 of the server component 106 may be a subsystem of file data including files and folders of data. One skilled in the art will recognize that system 100 may comprise a plurality of client components 102 (e.g., "Client Component 1" and "Client Component 2" shown in system 100) connected with the server component 106. As an example, the server component 106 stores a master copy of all data spread across a network (e.g., including a plurality of client components). In one instance, a client component 102, such as Client Component1, may locally store a file such as, for example, a document that represents an expense report. The client component 102 may interface with server component 106 to make sure a copy of the expense report is stored on server component 106. In that example, client component 2 may locally store a word processing document, for example, containing instructions for expense report review (e.g., policy rules for evaluating expensive reports). That client component 102 may interface with server component 106 to make sure a copy of the word processing document is stored on server component 106 along with the expense report in the one or more data stores of the server component 106. In one example, a client component 102 provides indication to the server component 106 that a new version of a file is available to be stored on the server component 106. In examples, a client component 102 may transmit a new version of a file to the server component 106 when an update (e.g., new version) is made to the file. In another example, the server component 106 periodically communicates with the one or more client components 102 to ensure that the server component 106 maintains a most recent version of a file maintained on a client component 102. In examples, the server component 106 may maintain a plurality of different versions of files (e.g., different version of a file such as the document that represents an expense report) in the event of file errors or a need to rollback/roll-forward versions of files.

Further, the server component 106 may store information knowledge data related to inconsistencies and repair options/actions. Knowledge data may be any data used for file management or file access including information to identify inconsistencies and repair files/libraries of files, as previously described. Examples of knowledge data that is maintained by a component of system 100 include but are not limited to: synchronization information and binary file information, data identifying components of system 100, definitions data for components of the system 100, policy rules for executing validations and repair actions, data that may be used for the attribute identification of inconsistencies, identification and application of repair actions, repair evaluation and execution, communication information for interfacing with a client component 102, among other examples.

Figure 2:
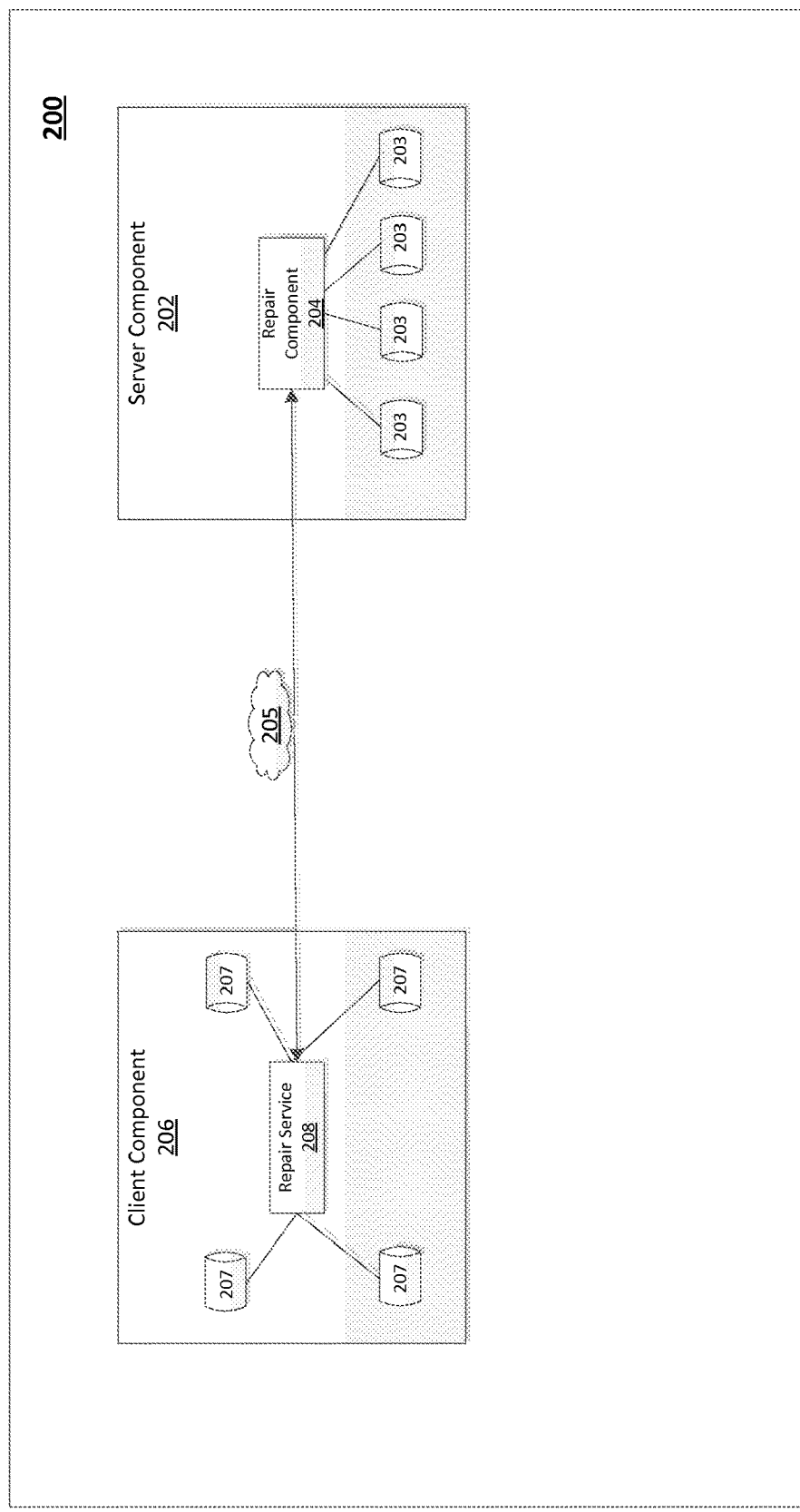
FIG. 2 illustrates an overview of an example distributed system that may be used for repair of files as described herein.

FIG. 2 illustrates an overview an exemplary distributed system 200 (hereinafter "system 200") that may be used for repair of files as described herein. Exemplary system 200 is a combination of interdependent components that interact to form an integrated whole for performing processing operations. Components of the systems may be hardware components or software implemented on and/or executed by hardware components of the systems. In examples, system 200 may include any of hardware components (e.g., used to execute/run operating system (OS)), and software components (e.g., applications, application programming interfaces, modules, virtual machines, runtime libraries, etc.) running on hardware. In one example, an exemplary system 200 may provide an environment for software components to run, obey constraints set for operating, and makes use of resources or facilities of the system 200, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. For examples of processing device operating environments, refer to the exemplary operating environments depicted in FIGS. 5-7. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 200 may vary and may include more or fewer components than those described in FIG. 2. A server component 202 is connectable to at least one client component 206 via network connection, and data may be transmitted between the server component 202 and a client component 206 over the network as shown by communication line 205 of FIG. 2. In examples, the server component 202 is a processing device and/or application/service running on a processing device that may be used for management access to a centralized resource or service in the network of system 200. In some examples, interfacing between components of the system 200 may occur remotely, for example where components of system 200 may be spread across one or more devices of the distributed network. In examples, the client component 206 may be a processing device running a repair service 208 based on the repair component 204 operating on the server component 202.

As an example, the system 200 may be used to run software components such as applications or services enabling clients or users to access and manage data through file hosting applications/services. System 200 may implement protocols or frameworks to oversee applications, services, processes, etc., running on one or more client component such as client component 206 of the system 200. In system 200, a repair component 204 may be hosted on a server component 202 and a client component 206 may interface with the server component 202 via a repair service 208, to enable a repair component 204 to remotely manage data stores on the client component 206. The repair service 208 may interface with a repair component 204 executing on the server component 202. In examples, the repair component 204 of the server component 202 may perform operations similar to those described above with respect to repair component 104 of FIG. 1. The repair component 204 is a processing device component or application/service that is usable to identify and fix inconsistencies among data stores maintained by one or more processing devices. As an example, repair component 204 may be used to identify and repair inconsistencies identified on data stores 207 of client component 206. In another example, repair component 204 may be used to identify and repair inconsistencies in data stores of other processing devices that may be associated with system 200. As one alternative example, a client component 206 may comprise a repair service 208 being an application or service that enables the server component 202, via the repair component 204, to remotely manage files/libraries of data stores 207 on the client component 206.

The client component 206 may comprise a plurality of data stores 207 (e.g., data storages/memory/virtual memory spaces) and a repair service 208 that connects with the repair component 204 of the server component 202 via a network. Data may be stored locally on the client component 206 using data stores 207. A data store 207 may be a subsystem of file data including files and folders of information. Examples of data stored by an individual data store 207 of the client component 206 may include, but are not limited to, the following types of data: validation data, metadata, a store for metadata about files on the file system, folder description information, and operating system data, among other examples. A file is a collection of data, instructions, object, etc. A file can store any type of data in any format.

Data stores 207 are integrated data stores that maintain different types of data. For example, each of the data stores 207 of client component 206 may store different types of data related to a file maintained locally on a client. In one example, a data store 207 may manage synchronization data for files maintained on the server component 202 and another data store may store data for files persisted to disk. In one example, each of the data stores 207 may be persisted to disk on the client component 206. However, one skilled in the art will recognize that data stores 207 may also be virtual memory maintained on the client component 206.

The server component 202 comprises one or more data stores 203 of data managed across a network of system 200. Similar to a data store 207 of the client component 206, a data store 203 of the server component 202 may be a subsystem of file data including files and folders of information. One skilled in the art will recognize that system 200 may comprise a plurality of client components such as client component 206 connected with the server component 202. As an example, the server component 202 stores a master copy of all data spread across a network (e.g., including a plurality of client components). The server component 202 may periodically communicate with a client component 206 to make sure that the server component 202 maintains a most recent version of a file maintained on a client component 206. In examples, the server component 202 may maintain a plurality of different versions of files (e.g., different version of a file such as expense report, word document, presentation, email, message, etc.) in the event of file errors or a need to rollback/roll-forward versions of files.

Further, the server component 202 may store information knowledge data related to inconsistencies and repair options/actions. Knowledge data may be any data used for file management or file access including information to identify inconsistencies and repair files/libraries of files. Examples of knowledge data that is maintained by a component of system 200 include but are not limited to: synchronization information and binary file information, data identifying components of system 200, definitions data for components of the system 200, policy rules for executing validations and repair actions, information for attribute identification of inconsistencies, identification and application of repair actions, repair evaluation and execution, communication information for interfacing with a client component 206, among other examples. Such knowledge data may be utilized by the repair component 204 to enable identification of inconsistencies on the client component 206 and update/repair files stored in data stores 207 of the client component 206.

FIG. 3A illustrates an exemplary method 300 for queue management of repair entries as described herein. As an example, method 300 may be executed by a component of an exemplary system such as system 100 of FIG. 1 and system 200 of FIG. 2. For example, method 300 may be performed by one of repair component 104 of FIG. 1, repair service 208 and repair component 204 of FIG. 2. In examples, method 300 may be executed on a device comprising at least one processor configured to store and execute operations, programs or instructions. However, method 300 is not limited to such examples. In other examples, method 300 may be performed by an application or service for file management.

A repair application/service may be maintained on a processing device and may be launched in any way including: upon initialization/booting of a system/device, by a user launching the application/service or upon system/developers launching the repair application/service remotely, or on a schedule (e.g., every 12 hours), among other examples. The repair application/service (e.g., operating on a processing device) may be used to identify and repair inconsistencies as previously described. Examples of a repair application/service include repair component 104 of FIG. 1, repair service 208 and repair component 204 of FIG. 2, among other examples. Upon launch, the repair application/service may comprise a queue of scans and/or repair action entries or queue entries for the repair application/service to address.

Method 300 may begin at operation 302 where queue entries are created for evaluation by a repair application/service. As an example, a queue entry may be created when one or more files of a data store on a processing device are scanned and an inconsistency is identified. However, one skilled in the art will recognize that creation (operation 302) of a queue entry may occur for any number of reasons. In one example, a queue entry represents an inconsistency for the repair application/service to address. Queue entries may take the form of different types as one skilled in the art will recognize that the repair application/service is robust enough to address a wide range of inconsistency including a potential inconsistency that has yet to be discovered by a user of a processing device. Examples of queue entry types that may be added to a queue of the repair application/service include, but are not limited to: enumeration of all libraries of one or more processing devices to detect inconsistencies including corrupted files, repair of a specific file or library of files that are to be repaired in a specific way, notification tasks such as user notification, follow-up tasks including checking that pre-requisites are satisfied, files are downloaded etc., and queue management tasks including prioritization of queue entries and scheduling, among other examples. The repair application/service may persist the queue and a history associated with inconsistency identification and repair in store/storage/memory of a processing device such as a client component or server component described in system 100 of FIG. 1 and system 200 of FIG. 2. A persisted queueing component and a persisted history component ensure, in addition to providing other functionality and benefits recognized to one of skill in the art, that: 1) if a crash occurs, a repair can be completed by picking up where it left off from or restarting the process; 2) different types of operations may occur in a priority order, and 3) updates of created queue entries can be tracked. In one example, operation 302 comprises creating a queue entry for evaluating a synchronization inconsistency identified and maintaining a persisted repair history for execution of repair actions on one or more files. In examples, the queue entry is updatable at any point after the queue entry is created. For instance, the queue entry may be updated by the persisted history component after a queue entry is created such as while a repair action is in progress.

When the repair application/service is active (e.g., launched or running) flow proceeds to decision operation 304 where a queue is checked for existing entries. In examples, queue entries are evaluated in priority order until a queue is empty. Priority may be set by developers in accordance with any rules or policies including, but not limited to, priority based on one or more of: time, scheduling, importance, severity of an inconsistency, dependency on other tasks or queue entries, etc. In examples where decision operation 304 determines that a queue is empty, a determination is made that that a repair process is complete, flow branches No, and the method 300 either closes or remains idle until new queue entries are added.

In examples where it is determined (in operation 304) that the queue has entries for processing, flow branches Yes and proceeds to operation 306 where properties may be restored from an existing queue entry run. As identified above, queue entries are evaluated in accordance with priority. In a case where a previous queue entry was initiated but not completed, the repair application/service identifies such instances via a queue entry evaluation history or repair history. In that example, where the repair action executed is not successful, the repair application/service may modify the priority of the queue entry (or create a new queue entry with high priority) to ensure that issues are addressed in a timely fashion. A history maintained by the repair application/service comprises data such as log data used to track execution of the repair application/service including, but not limited to: indications of a status of each queue entry, timestamp data, priority data, reasons for why a repair did not complete or failed, dependency data, notes/miscellaneous data, file data, and/or location data, among other examples.

Flow proceeds to operation 308 where entries of the queue are evaluated. As an example, evaluation of a queue entry may comprise executing a repair action to attempt to repair an inconsistency. In examples, completion or incompletion of operation 308 may result in an update to the history and/or re-scheduling or adding entries to a queue.

After evaluation (operation 308) of queue entries, flow may proceed back to operation 304 to determine if a queue has further entries to evaluate. If not, processing flow of method 300 ends until queue entries are added to the queue. If there are further queue entries to evaluate, flow of method 300 continues to evaluate all queue entries until the queue is empty.

Figure 3B:
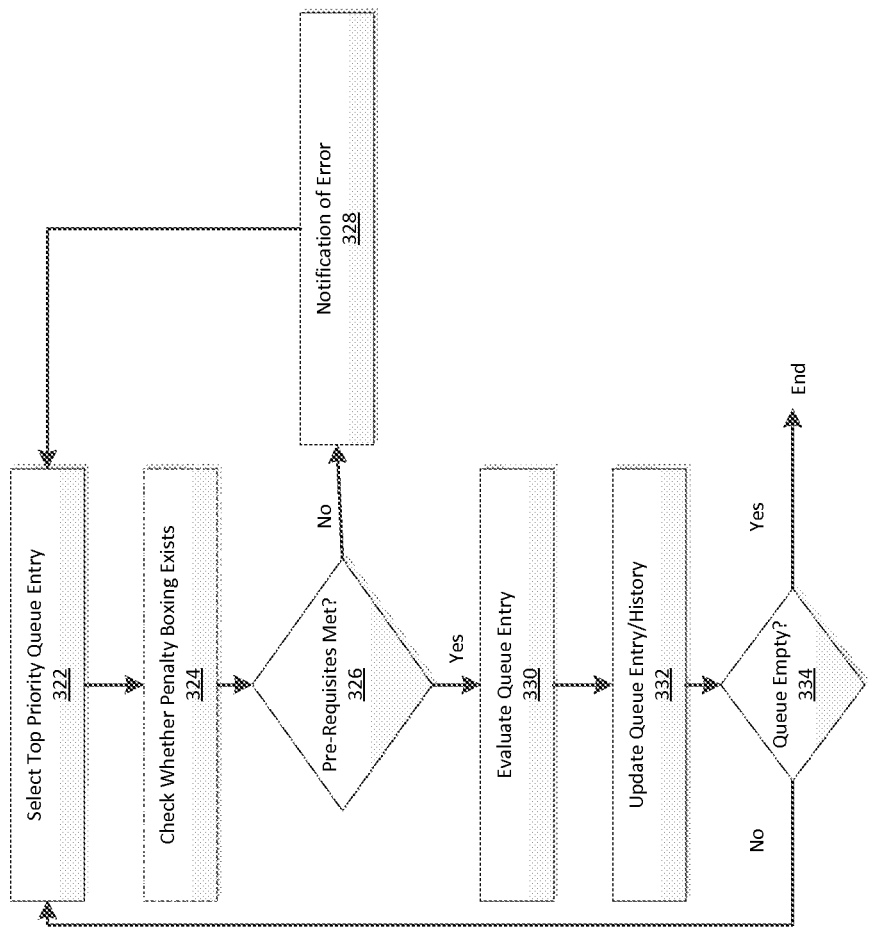
FIG. 3B illustrates an exemplary method for evaluation of a queued repair entry as described herein.

FIG. 3B illustrates an exemplary method 320 for evaluation of a queued repair entry as described herein. As an example, method 320 may be executed by a component of an exemplary system such as system 100 of FIG. 1 and system 200 of FIG. 2. For example, method 320 may be performed by one of repair component 104 of FIG. 1 and repair component 204 of FIG. 2. In examples, method 320 may be executed on a device comprising at least one processor configured to store and execute operations, programs or instructions. However, method 320 is not limited to such examples. In other examples, method 320 may be performed by an application or service for file management. A repair application/service may be used to identify and repair inconsistencies as previously described in the description of FIG. 3A. Examples of a repair application/service include repair component 104 of FIG. 1 and repair component 204 of FIG. 2, among other examples. Method 320 describes in further detail the processing of queued repair entries. In examples, the processing may be performed by a repair application/service executing on a processing device. The repair application/service may persist the queue and a history of the inconsistency identification and repair in a store/storage/memory stored on a processing device, for example, a client component or server component described in system 100 of FIG. 1 and system 200 of FIG. 2.

Method 320 begins at operation 322 where a top priority queue entry is selected from a queue of entries to be evaluated by the repair application/service. As identified above, queue entries can be assigned priorities. The priorities may be based on time, the type of inconsistency, and/or the type of data that is inconsistent, among other examples. Operation 322 may comprise evaluating priorities of queue entries. In examples, a top priority queue item may be selected for evaluation. In other examples, queue entries may be evaluated simultaneously such that entries from multiple queues are evaluated at the same time. The repair application/service may include knowledge data stored therewith including rules or policies for evaluating priority of queue entries. For example, restrictions may exist on processing of multiple queue entries, for instance, queue entries that have dependencies, multiple queue entries that aim to repair a same file, library or any other data associated with data stores of a processing device, among other examples.

In evaluating a queue entry, flow may proceed to check (operation 324) whether penalty boxing exists for a queue entry. In some examples, operation 324 may be optionally applied as penalty boxing does not necessarily relate to prevention of execution of queue entries. Penalty boxing is an operation that prevents a flawed repair action from causing permanent problems in an overall system/device. Examples of queue entries containing repair actions for which penalty boxing may be applied include, but are not limited to: repair actions that have run a predetermined number of times without completing, repair actions that may alter and/or harm other files or libraries of data stores, and repair actions that cannot execute due to checks/pre-requisites being unsatisfied, among other examples. In examples, a repair application/service may manage a run count for tracking the number of times that a repair action has been attempted. A check (operation 324) for penalty boxing may occur before, during or after processing of a queue entry to execute a repair action. In examples, a designation of penalty-boxing for an attempted repair action may also be provided during evaluation of a queue entry (operation 330 and FIG. 3C) or update (operation 332) of persisted queue entry/persisted history, as described below. Checking (operation 324) for penalty boxing may comprise updating a repair history to indicate that the repair action is flawed or otherwise unable to address the inconsistency. Another repair action should be performed when a repair action is determined to be unsuccessful after a predetermined number of attempts. As one example, operation 324 may also comprise preventing, based on an automated review of the repair history, execution of a repair action on one or more files when another repair application is currently operating on the one or more files. In examples where a queue entry is indicated as being penalty-boxed, the repair application/service may evaluate the reason that a queue entry has been flagged and determine further measures of action including, but not limited to: modifying a queue entry, re-prioritizing a queue entry, deleting a queue entry, creating a new queue entry, generating a notification, and/or performing further analysis on the queue entry, among other examples.

When a queue entry is to be processed, flow proceeds to decision operation 326 where it is determined if pre-requisites have to be satisfied prior to the evaluation of a queue entry and/or initiation of any potential repair action. Pre-requisites are checks that the repair application/service performs before proceeding with evaluation of a queue entry. Pre-requisites include, but are not limited to: queue prioritization review, evaluating files that are to be repaired, including whether a file to be repaired is locked, moved or modified, evaluating the processing load of a system or processing device that is to perform the repairs, determining whether the one or more files to be repaired is properly archived, determining whether there is adequate disk space to archive a file(s), determining whether adequate disk space exists to download one or more files, and/or comparing a file from server component with file to be repaired on a client component, among other examples. In one example, operation 326 may include performing actions such as delaying execution of the repair action until one or more pre-requisites checks are satisfied. Delaying the actions may also comprise re-prioritizing the queue entry until the pre-requisite checks are satisfied for a specific entry. If the pre-requisite checks are not satisfied based on evaluation in operation 326, flow proceeds to operation 328 where a notification of an error preventing execution of a repair action is generated. One or more notifications (operation 328) may be provided to any one or more of the repair application/service, administrators of the repair application/service, and users of the repair application/service, to address an identified issue with executing a queue entry for file repair.

When the pre-requisite checks indicate that a queue entry may be evaluated, flow proceeds to operation 330, where a queue entry is evaluated. Evaluation of a queue entry is described in greater detail with respect to the description of FIG. 3C below. Based on the evaluation (operation 330) of a queue entry, flow proceeds to operation 332 where a queue and a history may be updated based on the results of the evaluation. When updating the persisted queue, operation 332 may comprise modifying queue entries by adding, deleting, changing/updating the queue entry, and/or sending notifications based on the queue entry modification. When updating the persisted history, operation 332 may comprise modifying the history including providing updates based on success/failure of repair actions, updating queue dependencies, and/or modifying queue prioritization, among other examples. In one example of operation 332, a penalty-boxing indication may be provided by the repair application/service to prevent additional damage to a system/processing device when a queue entry executes a repair action that fails to complete successfully. In some examples, a repair action associated with a queue entry causes a file to be downloaded asynchronously to the repair process, and a "waiting" state is recorded in the persisted history until the file is later downloaded. Such an example may affect prioritization of queue entries for processing, for instance, where a queue entry may be scheduled to check if the download was completed and execute a repair action at a later point in time. In that example, a repair application/service may continue processing by proceeding with evaluating a next prioritized queue entry.

Upon completion of the update (operation 332) to the persisted queue and/or persisted history, flow proceeds to decision operation 334 where a determination is made as to whether the persisted queue has additional queue entries to evaluate or whether the persisted queue is empty. When decision operation 334 determines that the queue is empty, it is determined that the repair process is complete, flow branches No, and the method 320 either closes or remains idle until new queue entries are added. If decision operation 334 determines that there are additional queue entries to be processed, flow branches Yes and returns to operation 322 to begin processing the additional queue entries.

Figure 3C:
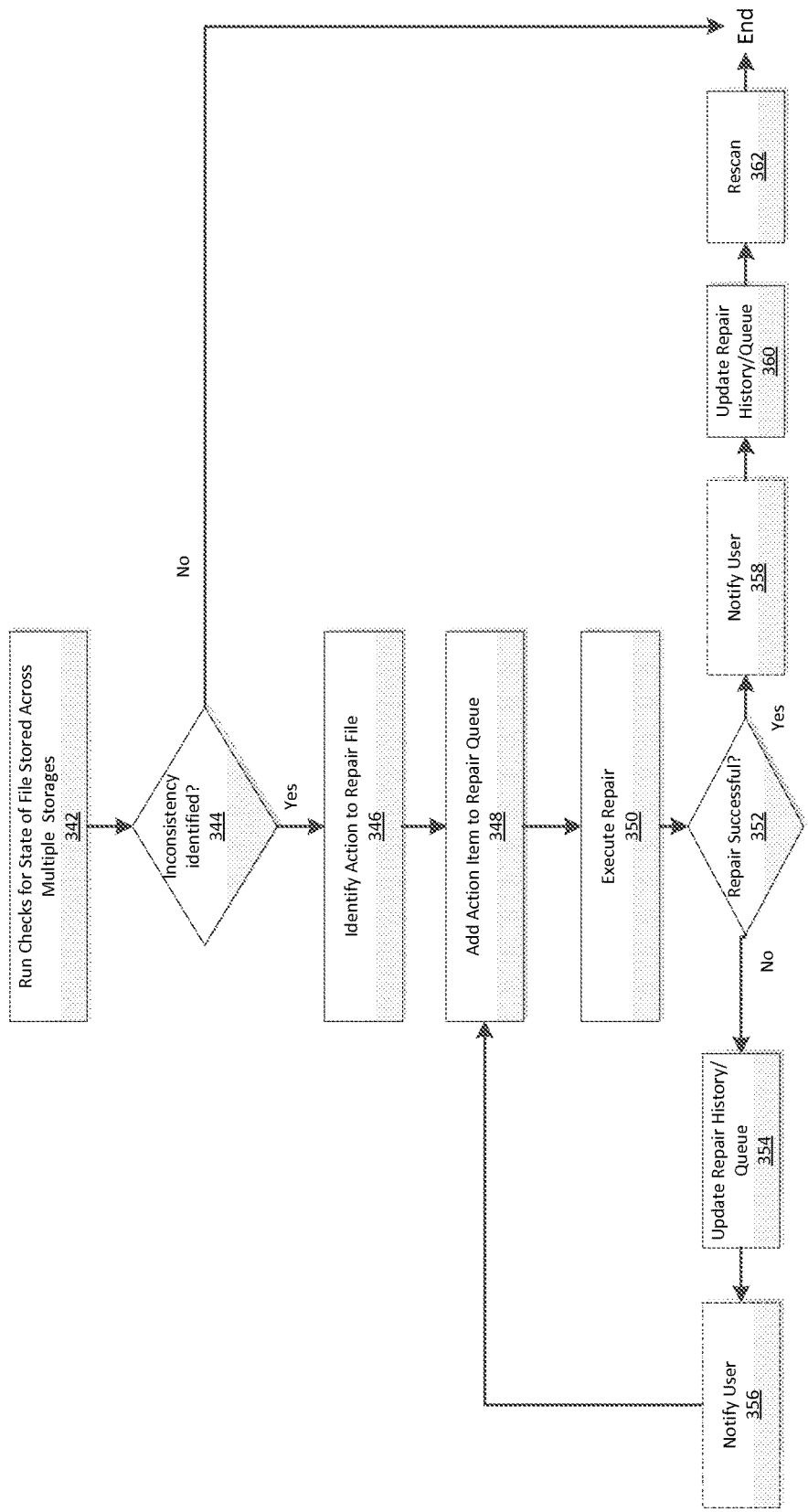
FIG. 3C illustrates an example method for processing and evaluation of a queue entry as described herein.

FIG. 3C illustrates an example method 340 for processing and evaluation of a queue entry as described herein. As an example, method 340 may be executed by a component of an exemplary system, such as system 100 of FIG. 1 and system 200 of FIG. 2. For example, method 340 may be performed by one of repair component 104 of FIG. 1 and repair component 204 of FIG. 2. In examples, method 340 may be executed on a device comprising at least one processor configured to store and execute operations, programs or instructions. However, method 340 is not limited to such examples. In other examples, method 340 may be performed by an application or service for file management. A repair application/service may be used to identify and repair inconsistencies as previously described in the description of FIGS. 3A and 3B. Method 340 describes further detail associated with a repair application/service (e.g., running on a processing device) processing and evaluating a queued repair entry. The repair application/service may persist the queue and a history associated with inconsistency identification and repair in store/storage/memory stored on a processing device, for example a client component or server component described in system 100 of FIG. 1 and system 200 of FIG. 2.

Method 340 begins at operation 342 where checks are performed to determine a state of one or more files stored across multiple storages on a processing device. For instance, multiple storages may be integrated stores that store portions of data for one or more files across multiple storages persisting on a processing device. In examples, the repair application/service may create one or more queue entries to evaluate files or libraries across the multiple storages. Checks may be performed to identify inconsistencies in files stored across the integrated storages based on a predetermined checklist. In examples, the predetermined checklist may be set and/or modified by administrators of the repair application/service, and applied intelligently based on the knowledge data maintained by the repair application/service.

Flow proceeds to decision operation 344 where it is determined if one or more inconsistencies are identified based on the checks performed in operation 342. As identified above, an inconsistency is any instance where a file is corrupted or data maintained by one data store does match data of another data store, including data stores maintained on one or more processing devices (e.g., client/server model). Inconsistencies include synchronization discrepancies in file data such as: metadata (e.g., structural metadata and descriptive metadata), content streams, and/or binary data or any other parts of data associated with a file. A content stream is any portion of a file (e.g., content) that is readily identifiable by an end-user. In one example, an inconsistency may be identified when integrated data storages on a processing device have a discrepancy regarding the synchronization of files maintained on the processing device. In another example, an inconsistency may be identified when files maintained on a processing device, such as a client component, have a synchronization discrepancy with files managed on another processing device such as a server component. In a case where operation 344 identifies that no inconsistencies are identified during a check (operation 342) of a queue entry, flow of method 340 ends.

Upon identifying an inconsistency related to a check (operation 342) performed on a queue, flow proceeds to operation 346 where an action to repair a file is identified. There are many different ways in which a file or library can be corrupted. Different types of corruption require different types of repair. Operation 346 comprises determining a repair action from a plurality of different repair actions based on attributes associated with the synchronization inconsistency identified. For example, a repair application/service may identify that a data storage, associated with management of a first portion of a file, indicates that a file is stored in a first location on a processing device when another data storage, associated with management of a second portion of the file, indicates that the file is stored in a different location on the processing device. In that example, operation 346 identifies that metadata associated with the file may need to be updated to avoid errors when the file is executed. In another example, operation 346 may identify that a file may need to be replaced (or alternatively, replace a version of a file maintained on a server processing device) because a content stream of a file maintained on a client processing device does not match a content stream of a version of the file maintained on the server processing device. In identifying a repair action that is best suited to address an identified inconsistency, operation 346 performs matching processing that evaluates a given library (e.g., of knowledge data for repair actions) for various different types of repair options and chooses a best repair action based on a current state of processing. Knowledge data applied to perform matching may include processing for ranking and evaluating an order of application for different repair actions, among other examples. Repair action identification may determine the best possible repair action by evaluating attributes associated with the identified inconsistency and applying a repair action that the repair application/service evaluates may repair the a file or library in the most efficient and least harmful manner. In examples, the matching processing may determine the best repair action for a first attempted repair as well as additional repair actions in the event that penalty-boxing occurs on when a repair action fails or fails to complete.

Once a repair action is identified, a repair action item is added (operation 348) to a persisted queue/repair action queue. In examples, creation of a repair queue entry may comprise including a priority for evaluation of the repair queue entry/execution of the repair action. Priorities associated with queue entries have been discussed in detail previously in the description of FIGS. 3A and 3B. Flow proceeds to operation 350 where a repair is executed on a file based on processing of a queue entry associated with a repair action. An example processing flow related to repair action execution is provided in the description of FIG. 4 below.

Flow proceeds to decision operation 352 where the repair application/service determines whether a repair action is successfully applied. In a case where decision operation 352 determines that the one or more repair actions were not successfully applied, flow branches No and proceeds to operation 354 where a persisted repair history (and/or persisted queue) is updated to indicate that the repair action was unsuccessful. As an example, updating (operation 354) the persisted repair history and/or persisted queue comprises evaluating execution of the repair action. Evaluation of execution of the repair action may comprise providing a penalty box notification with respect to the attempted repair action. The repair application/service may determine whether to schedule or add a new queue entry associated with repeated attempt of a repair action or attempt of an alternative repair action based on the evaluating of the execution of the repair action. In some examples of method 340, flow proceeds to operation 356 where a user is notified of the error in repair. However, notification (operation 356) may not occur in every processing example, as there are cases where the repair application/service may identify additional repair actions to apply before notifying a user that a file may be corrupted. In examples, notification to a user is discretionary based on policies and rules applied by administrators of the repair application/service. In other examples, a notification may be sent to a user in operation 356 before a new action item is added (operation 348) to a repair queue to re-attempt to repair a file, for example using a different repair action.

In a case where decision operation 352 determines that execution of the repair action is successful, flow branches Yes, and proceeds to operation 360 where a persisted repair history (and/or persisted queue) is updated to indicate that the repair action was successful. In examples, an update to a persisted queue may comprise removing a queue entry from the persisted queue upon successful completion. In some examples, flow of method 340 may include operation 358 where a notification is sent to a user that the repair is successful. In some examples, operation 358 may occur after a rescan processing (operation 362) has been performed to confirm that the repair was successful. In examples, operation 362 (rescanning) is performed by the repair application/service to verify that a repair action fixed the inconsistency associated with a file or data storages managing a file. In some examples, performing a rescan (operation 362) comprises adding a new queue entry item to re-evaluate a file stored across multiple integrated storages. In examples, where a queue entry is created for rescanning, that queue entry may be assigned a highest priority. In a case where a rescan identifies an inconsistency, a new queue entry may be created to address the inconsistency and information may be reported to network administrators to further evaluate what happened.

In alternative examples, update (operation 360) of a persisted repair history and/or persisted repair queue occurs after a rescan processing (operation 362) is performed, for example where a queue entry is removed after a successful rescan. When operation 362 confirms that the inconsistency is remedied/repaired, flow processing completes.

Figure 4:
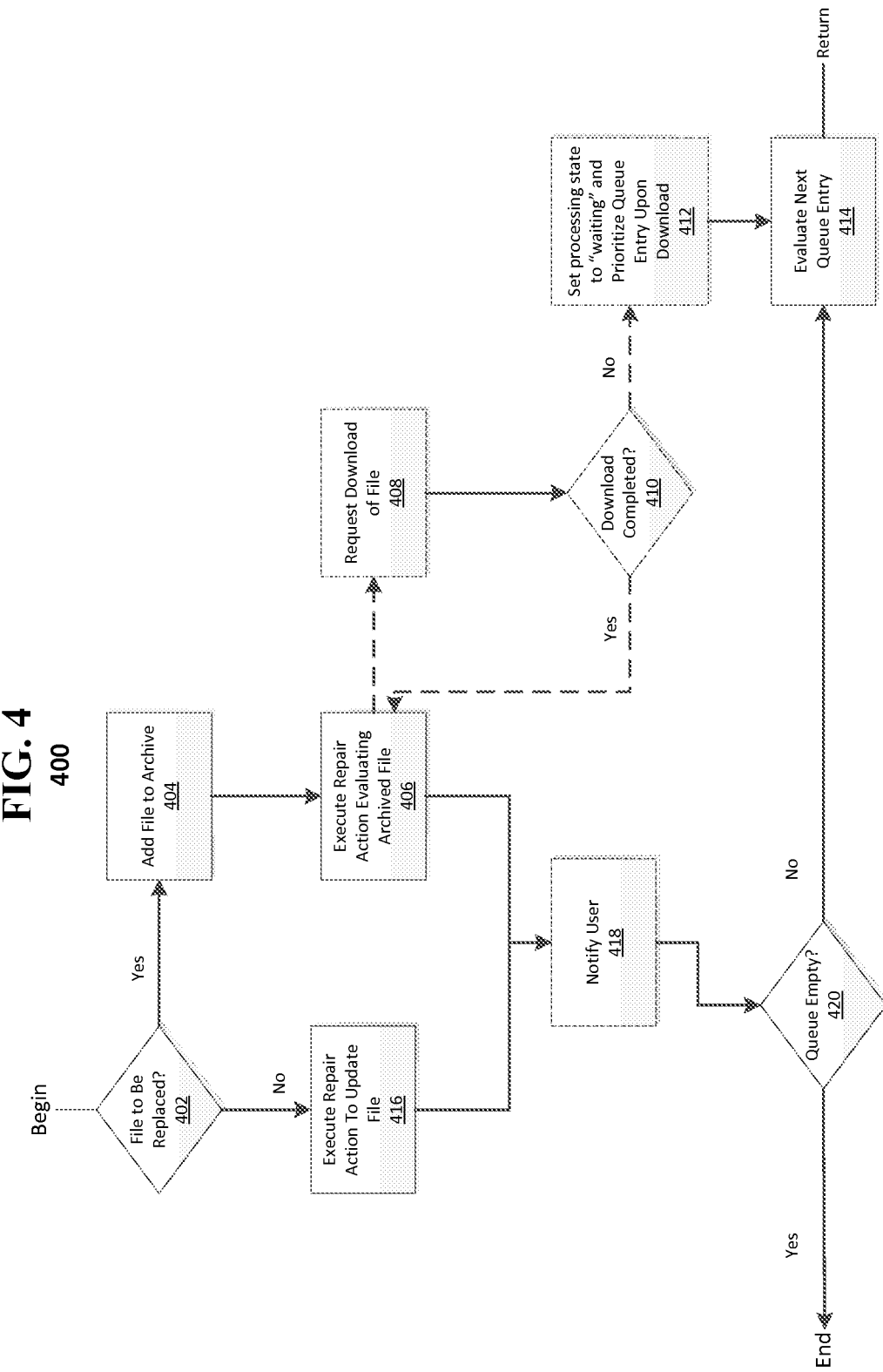
FIG. 4 illustrates an example method for executing a file replacement repair as described herein.

FIG. 4 illustrates an example method 400 for executing a file replacement repair as described herein. As an example, method 400 may be executed by a component of an exemplary system such as system 100 of FIG. 1 and/or system 200 of FIG. 2. For example, method 400 may be performed by one of repair component 104 of FIG. 1 and /or repair component 204 of FIG. 2. In examples, method 400 may be executed on a device comprising at least one processor configured to store and execute operations, programs or instructions. However, method 400 is not limited to such examples. In other examples, method 400 may be performed an application or service for file management.

Method 400 is a processing flow related to execution of a repair action to repair an identified inconsistency. Flow begins at decision operation 402 where a determination is made as to whether or not a file is to be replaced. In some cases, a repair action to be executed does not require file replacement. A repair action can be selected and executed (operation 416) that repairs a file (e.g., updates metadata) without actually replacing a file. In other cases, the repair application/service may need to further evaluate a file to determine a best course of action for repairing the file. In that example, the repair application/service determines that a file may need to be replaced. In that case, flow proceeds to operation 404 where a version of the file to potentially be replaced is moved to an archive managed by the repair application/service.

In operation 404, the repair application/service may add a file that may potentially be replaced to an archive managed by the repair application/service. The repair application/service may manage one or more archives for file repair evaluation. An archive is one or more secure folders/directories associated with the repair application/service. As an example, the archive is persisted on a processing device on which the file is stored, such as a client processing device. In other examples, the archive may be persisted remotely on another processing device such as a server processing device. In one example, when a file (from a file library, directory, memory, store, etc.) is moved to an archive for repair, the repair application/service may prevent other repair actions from being applied to the file and/or a library associated with the file until the repair action is completed. In other examples, additional repair actions may be applicable to files or libraries associated with an archived file during execution of a repair action.

Flow may proceed to operation 406 where a repair action to evaluate the archived file is executed. In some examples of method 400, operation 406 may determine that execution of the repair action comprises downloading a file from another source. The downloaded file may be used to evaluate the archived file. In that case, operation 406 may determine that a file for comparison with the archived file is not present and is to be downloaded. Flow may then proceed to operation 408 where download of a file is requested from a remote source (e.g., another processing device such as a server component).

In examples of a repair application/service where operation 408 requests a file for download, files can be downloaded asynchronously from execution of a repair processing. Among other examples, this may provide an added security measure for evaluating how file downloads were requested. Policy rules may be set by administrators in regard to downloading of files associated with repair operations. For example, in cases where it is determined that a file for comparison with the archived filed was downloaded at the request of the repair application/service, the repair application/service may proceed with execution of a repair action.

In examples, the repair application/service may intelligently adapt based on a type of repair action being initiated. For instance, flow may proceed to decision operation 410 where it is determined whether a requested download is completed. If a requested download has not completed, flow may proceed to operation 412 where a processing state for queue entry associated with a repair action is set to "waiting." Operation 412 may further comprise modifying a priority of a queue entry associated with a repair action that is awaiting download of file. Accordingly, the queue entry that is waiting for a file download may be evaluated at a later point in time, such as when the file download is completed. In such an example, the repair application/service may update the persisted queue to reflect that a repair action is no longer executing and that the queue entry has been rescheduled. Flow may proceed to operation 414 where a next queue entry is evaluated.

In alternative examples (not shown), a file download may not be required. Instead, the repair application/service may be configured to evaluate a file, archived on a first processing device (e.g., client component), in comparison with a version of a file maintained on a second processing device (e.g., server component).

In an example where decision operation 410 determines that a requested download has completed, flow may return to operation 406 where the archived file is evaluated. As indicated above, the archived file may be evaluated in comparison with the downloaded file. For example, the repair application/service may compare one or more portions of the archived file with one or more portions of a corresponding downloaded file. In some examples, the repair application/service may evaluate whether the archived file is a binary match with the downloaded file, for example evaluating a hash of the archived file with a hash of the downloaded file. However, in other examples, the repair application/service may compare other portions of the files, for example content streams of the files, to more effectively determine whether the two files are similar enough to each other. As identified above, a content stream is any portion of a file (e.g., content) that is readily identifiable by an end-user. For instance, consider an example where a server maintains one version of an expense report that was saved to the server by a user of a user group. In that example, another user of the user group may have a copy of the expense report on the user's client device that has exactly the same content. In a case where an inconsistency is identified with regard to a copy of the expense report maintained on the client device (e.g., data stores on the client device have lost synchronization with respect to the expense report or it is identified that the expense report on the client device may be different from the version of the expense report maintained on the server device), the repair service may download a version of the expense report from the server device to compare with an archived version of the expense report on the client device. When the server copy of the expense report is downloaded for comparison against the version of the expense report maintained on the client device, binary hash data associated with each of the files may not match because the metadata associated with the files may be different (e.g., metadata indicating a user who last modified a document, timestamp information, etc.). However, while the hash data associated with the files may be different, the actual contents of the expense report that are viewable to a user/viewer of the expense reports may be exactly the same. In that case, the repair application/service is able to determine a repair action (e.g., replace the file) by evaluating identifying that the content of the archived file is the same as the content of the downloaded file. Accordingly, the repair application/service may select further action for repairing a file based on comparing a content stream of the archived version of the file with a content stream of a version of the file maintained by a server device, for example that may be downloaded to a client device. In other examples, the repair application/service may compare the archived file version and the downloaded file version using multiple different types of file data including hashes, metadata, and content streams, among other examples. In some examples, the repair application/service may selectively determine whether to replace and delete an archived version or keep an archived version of the file. In other cases, further action taken by the repair application/service is a notification to a user to determine which version of a file to store locally (e.g., archived version or downloaded version). In some examples, a file or version of a file may be updated on a service device based on a user notification selection. For example, if a user identifies that an archived version should be kept instead of the newer version of a file, updates may occur based on the user selection. In some examples, the archive retains archived libraries or files that do not match corresponding restored libraries or files. For example, the archive may maintain copies or versions of files at different states of repair (e.g., before repair, during repair, after repair) in the event that the repair application/service needs to restore a different version of a file.

Operation 406 comprises executing one or more actions to attempt to repair an identified inconsistency. As described above, one action may comprise downloading a file for comparison with the archived file and evaluating the archived file with the downloaded file. In examples, more than one action may be executed in an attempted repair action. In one example, if a further action is selected based on evaluating the files (e.g., content streams of the files) to replace the archived file with the downloaded file, operation 406 repairs the inconsistency by replacing the archived version of the file. In instances of that example, the replaced archived version of the file may be deleted. However, in other examples, archived files may be retained for a predetermined period determined based on time or a number of versions/revisions of a file. As described above in the description of FIGS. 3A-3C, a persisted queue and persisted repair history may be updated based on execution of a repair action. Operation 406 may comprise an update to one or more of the persisted queue and the persisted repair history.

In some examples of method 400, flow may proceed to notify (operation 418) a user of a result of executing the repair action. As shown in method 400, flow may proceed to operation 418 as a result of processing operations 406 or 416. Notification (operation 418) to a user may comprise output of a result of an executed repair action. In some examples of method 400, a user may not be notified of execution of a repair action. Repair actions are designed to address inconsistencies before an inconsistency causes an issue for a user. As such, user notifications may be selectively provided in accordance with policies administered by the repair application/service.

Flow may then proceed to decision operation 420 where it is determined if a persisted queue is empty or not. If there are no more queue entries to process, flow branches Yes and the method 340 terminates until further queue entries are created. If there are additional queue entries to evaluate, flow proceeds to operation 414 where a next queue entry is evaluated.

Figure 5:
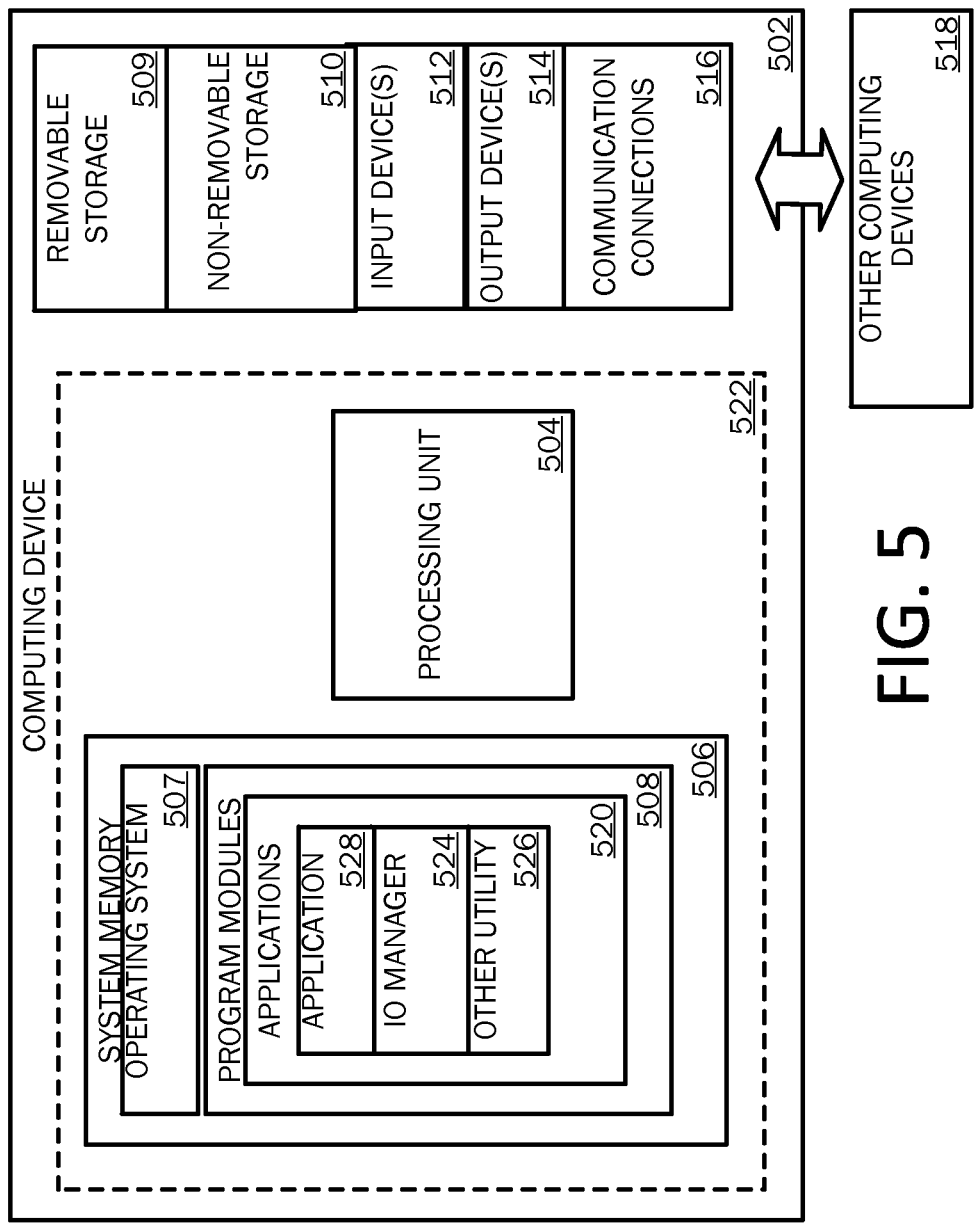
FIG. 5 is a block diagram illustrating an example of a computing device with which aspects of the present disclosure may be practiced.
Figure 6A:
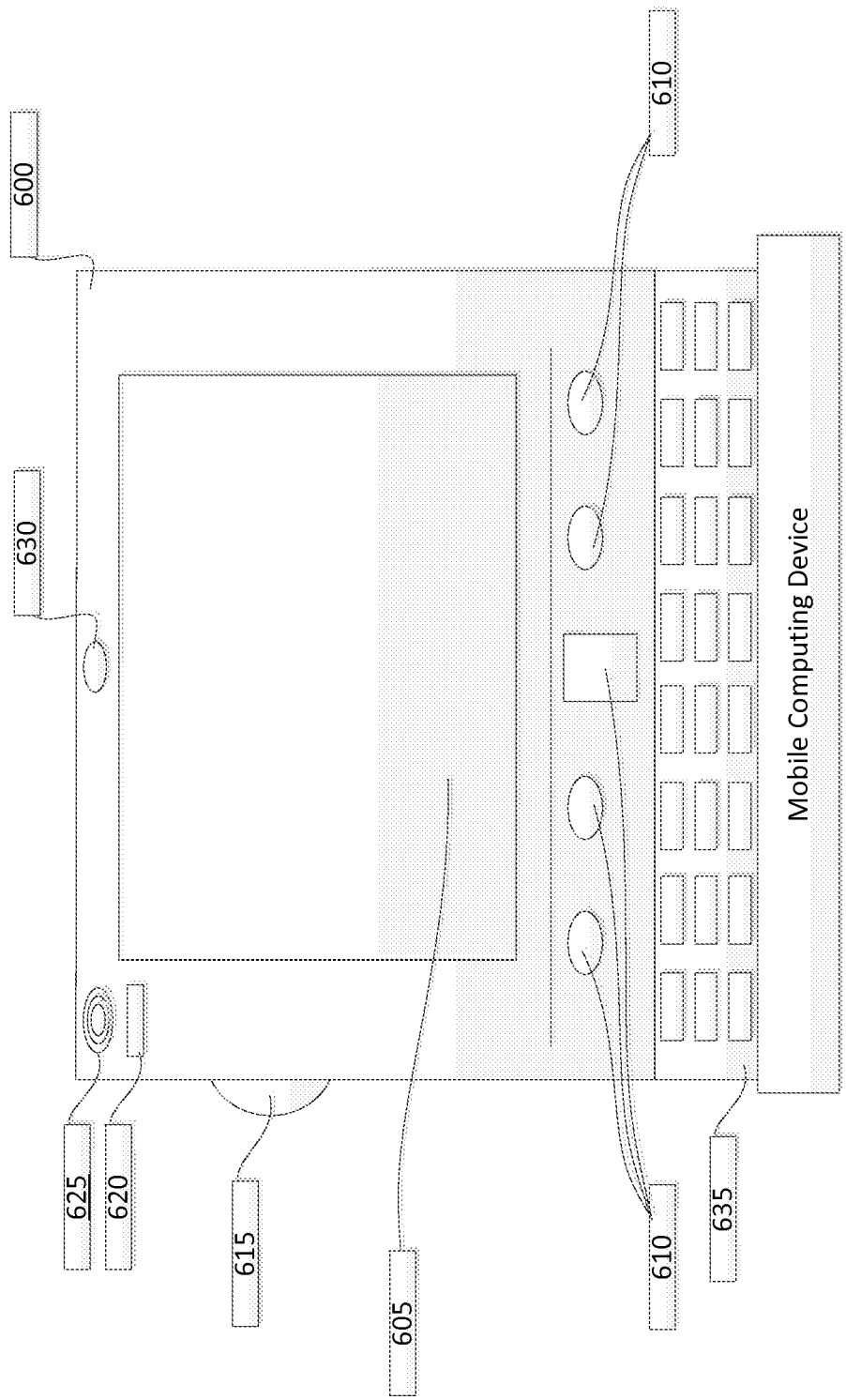
FIGS. 6A and 6B are simplified block diagrams of a mobile computing device with which aspects of the present disclosure may be practiced.
Figure 6B:
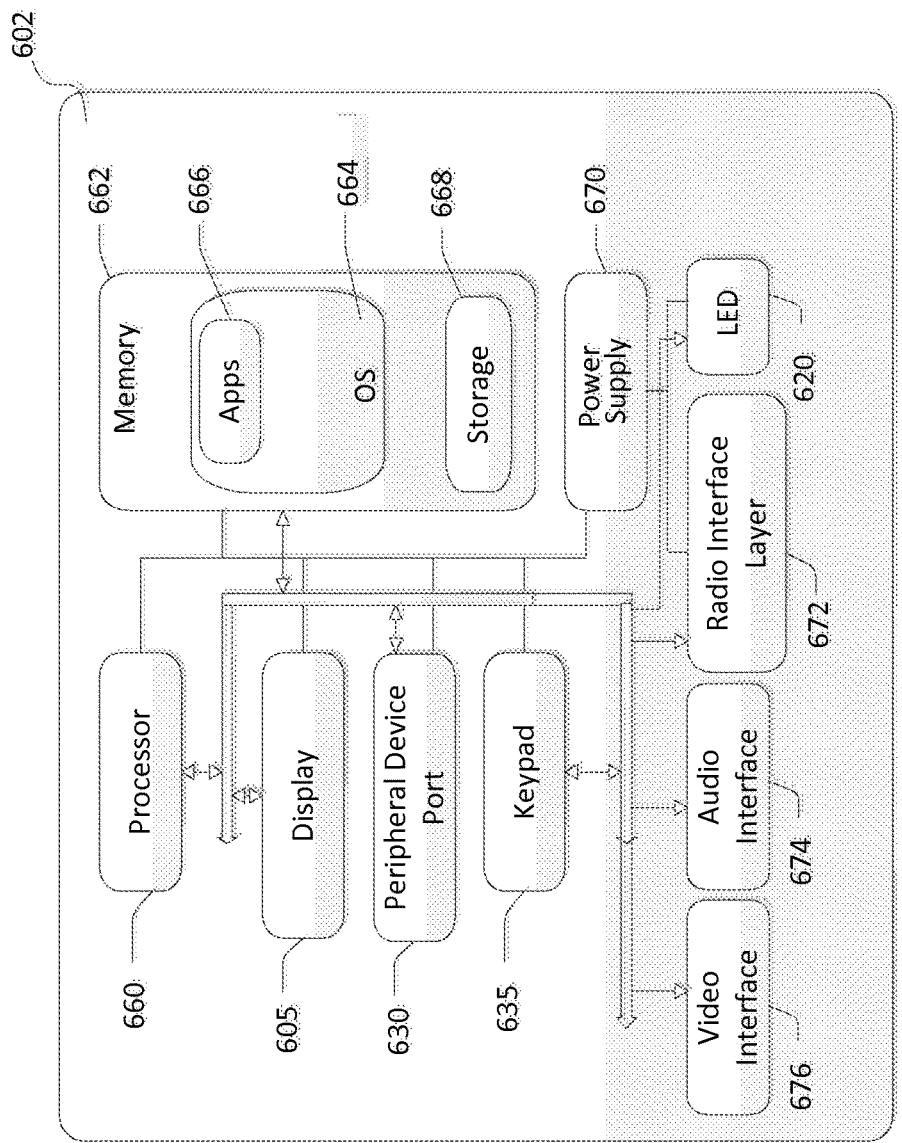
Figure 7:
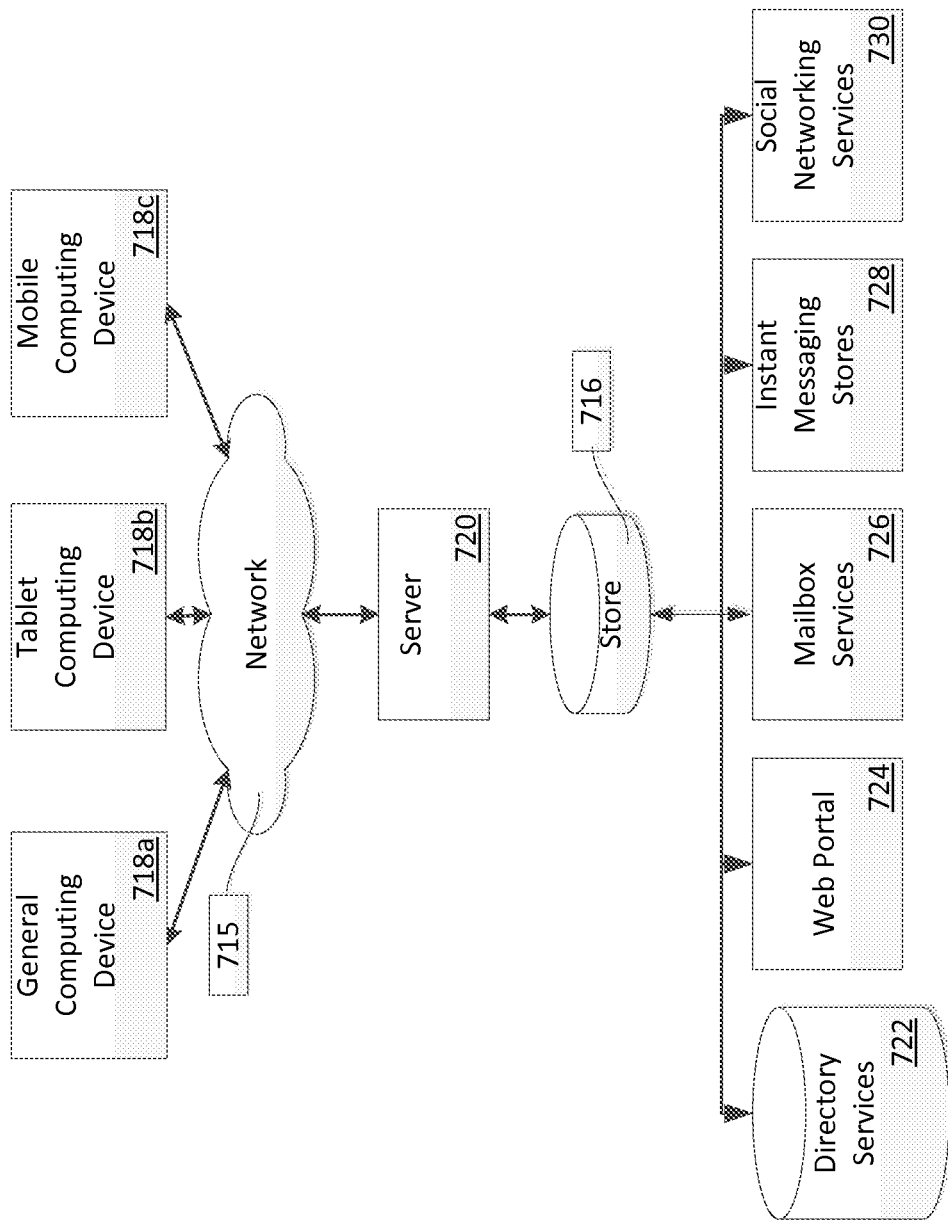
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a client, a data store, a data consistency expert component, a central knowledge component or a telemetry component, as described herein, with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as IO manager 524, other utility 526 and applications 528. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., Input/Output (I/O) manager 524, other utility 526 and application 528) may perform processes including, but not limited to, one or more of the stages of examples described in FIGS. 1-4, for example. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples of the invention may be practiced. For example, mobile computing device 600 may be used to implement a client, a data store, a repair component, and a server component, as examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one examples, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including 10 manager 524, other utility 526 and applications 528 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with IO manager 524, other utility 526, and applications 528 (e.g., program/module for data consistency expert 107 and data consistency component 202) may be stored in different communication channels or other storage types. For example, various documents may be stored using a directory service 722, a web portal 724, a mailbox service 726, an instant messaging store 728, or a social networking site 730, virtual file system 108, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

The invention claimed is:

1. A computer-implemented method comprising:
   storing a file across two or more data stores on a client device;
   identifying an inconsistency associated with the file stored across the two or more data stores on the client device, the inconsistency indicating that data associated with the file maintained on one of the data stores on the client device does not match data associated with the file maintained on another of the data stores on the client device;
   creating an archived version of the file on the client device when the inconsistency is identified, the archived version including the inconsistency and preventing more than one repair action on the file;
   executing a repair action associated with the file, wherein executing the repair action comprises selecting a further action based on comparing a content stream of the archived version of the file with a content stream of a master version of the file maintained by a server device;

determining whether the file is successfully repaired based on executing the repair action;

maintaining the archived version of the file until a condition is met based on the repair action; and transmitting a notification when the condition is met, wherein the notification includes at least one selectable action for storing the archived version of the file on the client device.

2. The computer-implemented method according to claim 1, further comprising determining the repair action from a plurality of different repair actions based on attributes associated with a synchronization inconsistency identified.

3. The computer-implemented method according to claim 1, wherein determining whether the file is successfully repaired further comprises updating a repair history based on a result of executing the repair action and rescanning the two or more data stores on the client device after the repair action is executed.

4. The computer-implemented method according to claim 1, further comprising creating a queue entry for evaluating the inconsistency identified and maintaining a persisted repair history for execution of repair actions on one or more files, wherein the queue entry is updatable at any point after the queue entry is created.

5. The computer-implemented method according to claim 4, wherein when the file is determined to be unsuccessfully repaired for a predetermined number of attempts, the computer-implemented method further comprising updating the persisted repair history to indicate that the repair action is flawed and that another repair action is to be applied.

6. The computer-implemented method according to claim 4, further comprising preventing, based on an automated review of the persisted repair history, execution of the repair action on one or more files when another repair action is being applied to the one or more files.

7. The computer-implemented method according to claim 4, further comprising delaying execution of the repair action until pre-requisite checks are satisfied, wherein the delaying further comprises re-prioritizing the queue entry until the pre-requisite checks are satisfied, and notifying the client device when the pre-requisite checks are unsatisfied.

8. The computer-implemented method according to claim 1, further comprising requesting download, to the client device, of the master version of the file maintained by the server device and executing the repair action when it is determined that the master version of the file maintained by the server device is downloaded to the client device.

9. The computer-implemented method according to claim 8, further comprising re-prioritizing a queue entry for executing the repair action when the repair action is scheduled to execute and a requested download of the master version of the file maintained by the server device is incomplete.

10. A system comprising:

a memory; and at least one processor operatively connected with the memory, programmed to execute operations comprising:

storing a file across two or more data stores on a client device;

identifying an inconsistency associated with the file stored across the two or more data stores on the client device, the inconsistency indicating that data associated with the file maintained on one of the data stores on the client device does not match data associated with the file maintained on another of the data stores on the client device;

creating an archived version of the file on the client device when the inconsistency is identified, the archived version including the inconsistency and preventing more than one repair action on the file;

executing a repair action associated with the file, wherein executing the repair action comprises selecting a further action based on comparing a content stream of the archived version of the file with a content stream of a master version of the file maintained by a server device;

determining whether the file is successfully repaired based on executing the repair action;

maintaining the archived version of the file until a condition is met based on the repair action; and transmitting a notification when the condition is met, wherein the notification includes at least one selectable action for storing the archived version of the file on the client device.

11. The system according to claim 10, wherein the operations executed by the processor further comprise determining the repair action from a plurality of different repair actions based on attributes associated with the inconsistency identified.

12. The system according to claim 10, wherein determining whether the file is successfully repaired further comprises updating a repair history based on a result of executing the repair action and rescanning the two or more data stores on the client device after the repair action is executed.

13. The system according to claim 10, wherein the operations executed by the processor further comprise creating a queue entry for evaluating the inconsistency identified and maintaining a persisted repair history for execution of repair actions on one or more files, wherein the queue entry is updatable at any point after the queue entry is created.

14. The system according to claim 13, wherein when the file is determined to be unsuccessfully repaired for a predetermined number of attempts, the operations executed by the processor further comprise updating the persisted repair history to indicate that the repair action is flawed and that another repair action is to be applied.

15. The system according to claim 13, wherein the operations executed by the processor further comprise preventing, based on an automated review of the persisted repair history, execution of the repair action on one or more files when another repair action is being applied to the one or more files.

16. The system according to claim 13, wherein the operations executed by the processor further comprise delaying execution of the repair action until pre-requisite checks are satisfied, wherein delaying further comprises re-prioritizing the queue entry until the pre-requisite checks are satisfied, and the operations executed by the processor further comprise notifying the client device that the pre-requisite checks are unsatisfied.

17. The system according to claim 10, wherein the operations executed by the processor further comprise requesting download, to the client device, of the master version of the file maintained by the server device and executing the repair action when it is determined that the master version of the file maintained by the server device is downloaded to the client device.

18. The system according to claim 17, wherein the operations executed by the processor further comprise re-prioritizing a queue entry for executing the repair action when the repair action is scheduled to execute and a requested download of the master version of the file maintained by the server device is incomplete.

19. A computer-readable storage device including executable instructions, that when executed on at least one processor, cause the processor to perform operations comprising:

storing a file across two or more data stores on a client device;

identifying an inconsistency associated with the file stored across the two or more data stores on the client device, the inconsistency indicating that data associated with the file maintained on one of the data stores on the client device does not match data associated with the file maintained on another of the data stores on the client device;

determining a repair action from a plurality of different repair actions based on attributes associated with the inconsistency identified, wherein the repair action includes moving the file to an archive, and wherein the archive is configured to prevent more than one repair action on the file;

creating a repair queue entry in a persisted repair queue, the repair queue entry representing the inconsistency to be addressed by execution of the repair action;

executing the repair action associated with the file as scheduled within the persisted repair queue when pre-requisite checks are satisfied and a persisted repair history for execution of repair actions indicates that no conflicting repair action exists;

updating the persisted repair history and the persisted repair queue based on executing the repair action;

maintaining the repair queue entry until a condition is met based on the repair action; and transmitting a notification when the condition is met, wherein the notification includes at least one selectable action for storing the file from the archive on the client device.

20. The computer-readable storage device according to claim 19, wherein the operations executed by the processor further comprise re-evaluating the repair queue entry when at least one of the following are identified: the pre-requisite checks are unsatisfied and the persisted repair history indicates a conflicting repair action exists, and the re-evaluating further comprises one of re-prioritizing the repair queue entry or creating a new repair queue entry associated with another repair action.

* * * * *